US009168716B2

(12) United States Patent
Benedetti et al.

(10) Patent No.: US 9,168,716 B2
(45) Date of Patent: Oct. 27, 2015

(54) METALLIC SANDWICH STRUCTURE HAVING SMALL BEND RADIUS

(75) Inventors: Brenda Benedetti, Seattle, WA (US);
Robert S. Farrell, Seattle, WA (US);
Luis R. Leon, Federal Way, WA (US);
Justin H. Lan, Bothell, WA (US);
Garry A. Booker, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 484 days.

(21) Appl. No.: 13/620,679

(22) Filed: Sep. 14, 2012

(65) Prior Publication Data
US 2014/0077031 A1   Mar. 20, 2014

(51) Int. Cl.
| B64D 45/02 | (2006.01) |
| B32B 3/12 | (2006.01) |
| B32B 15/01 | (2006.01) |
| B32B 3/28 | (2006.01) |
| B64D 29/06 | (2006.01) |
| F02K 1/82 | (2006.01) |
| F02C 7/045 | (2006.01) |
| B64D 33/02 | (2006.01) |

(52) U.S. Cl.
CPC ... *B32B 3/12* (2013.01); *B32B 3/28* (2013.01); *B32B 15/01* (2013.01); *B64D 29/06* (2013.01); *F02C 7/045* (2013.01); *F02K 1/827* (2013.01); *B64D 2033/0206* (2013.01); *Y02T 50/671* (2013.01); *Y10T 428/1234* (2015.01); *Y10T 428/1241* (2015.01)

(58) Field of Classification Search
USPC .......................................................... 244/1 N
See application file for complete search history.

(56) References Cited

U.S. PATENT DOCUMENTS

| 3,301,732 | A | * | 1/1967 | Kunz ........................ 156/304.3 |
| 4,594,120 | A | * | 6/1986 | Bourland et al. ............. 156/155 |
| 4,759,513 | A | * | 7/1988 | Birbragher .................... 244/1 N |
| 4,825,648 | A | * | 5/1989 | Adamson ..................... 60/226.1 |
| 4,917,747 | A | * | 4/1990 | Chin et al. .................... 156/198 |
| 5,083,426 | A | * | 1/1992 | Layland ....................... 60/226.1 |
| 5,251,435 | A | * | 10/1993 | Pauley ......................... 60/226.1 |
| 6,051,302 | A | * | 4/2000 | Moore .......................... 428/116 |
| 6,098,926 | A | * | 8/2000 | Morgenthaler .............. 244/119 |
| 6,129,311 | A | * | 10/2000 | Welch et al. .............. 244/117 R |
| 7,370,467 | B2 | * | 5/2008 | Eleftheriou et al. ......... 60/226.1 |
| 8,245,815 | B2 | * | 8/2012 | Valleroy et al. ............... 181/292 |
| 2002/0036115 | A1 | | 3/2002 | Wilson | |
| 2010/0133378 | A1 | | 6/2010 | Lidoine | |

FOREIGN PATENT DOCUMENTS

FR     2917714     12/2008

OTHER PUBLICATIONS

PCT/US20131056590 International Search Report dated Aug. 29, 2014.

* cited by examiner

*Primary Examiner* — Brian M O'Hara
*Assistant Examiner* — Keith L Dixon

(57) ABSTRACT

An acoustic-attenuating wall panel for a nacelle of a turbine engine may include a radiused portion. The radiused portion may include an airflow surface having a concave configuration and which may be exposed to an airflow passing through the nacelle. The radiused portion may include an acoustic attenuating section.

20 Claims, 12 Drawing Sheets

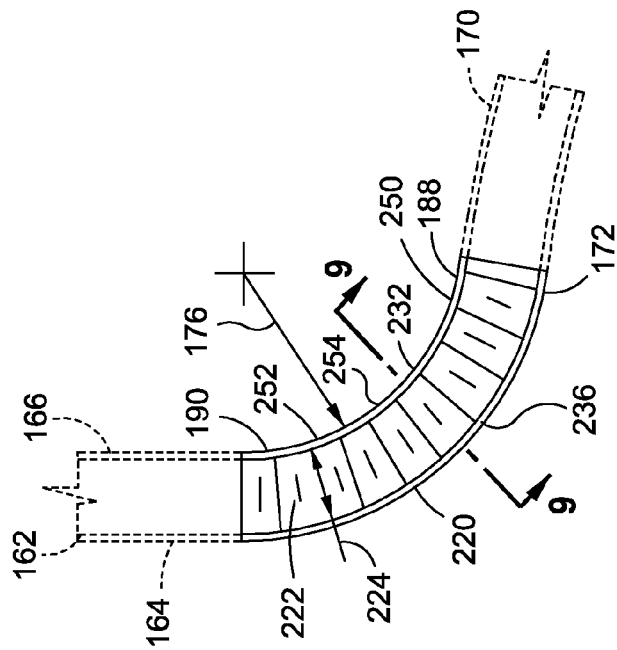
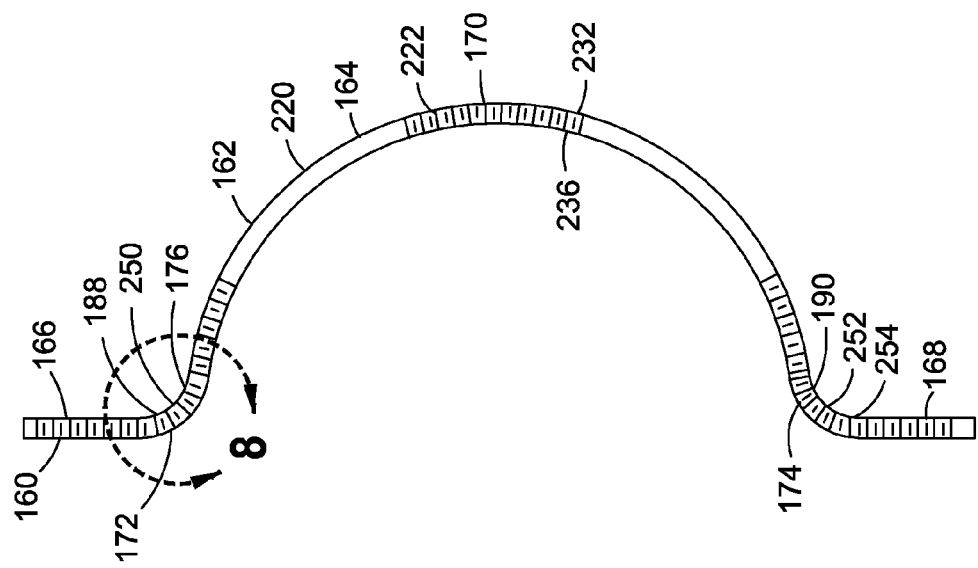
FIG. 8
FIG. 7

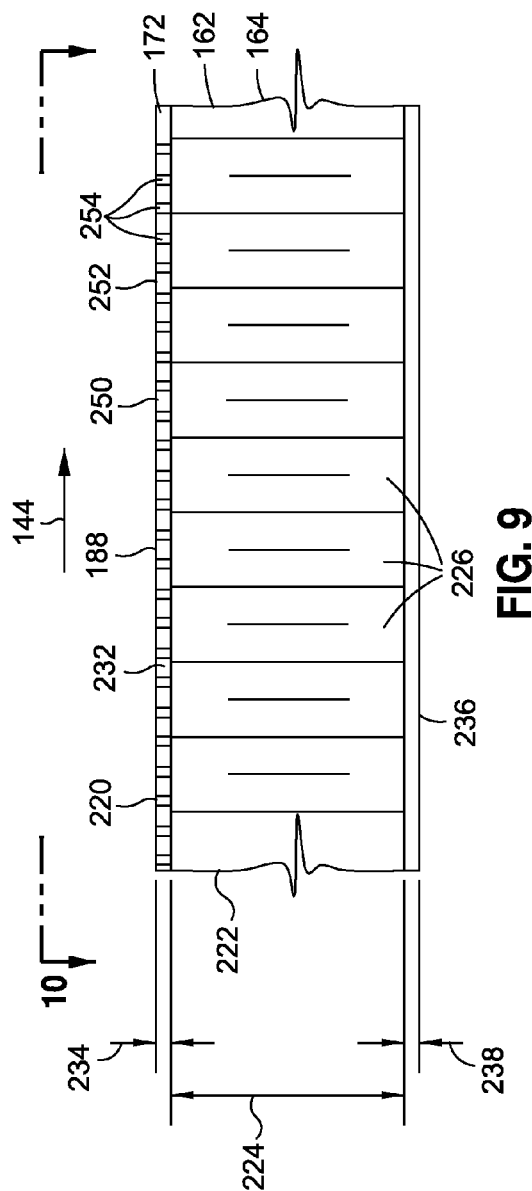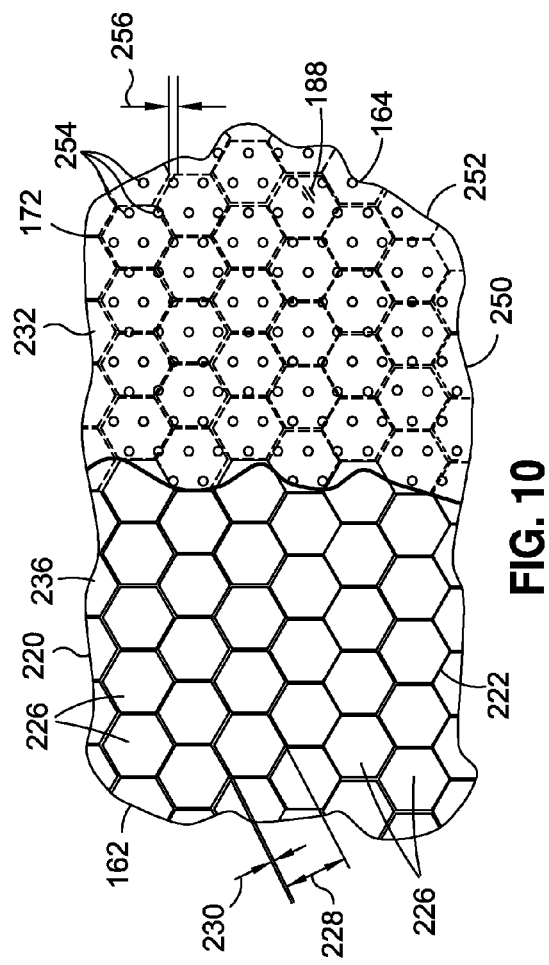

METALLIC SANDWICH STRUCTURE HAVING SMALL BEND RADIUS

FIELD

The present disclosure relates generally to sandwich structures and, more particularly, to a metallic honeycomb sandwich structure formed at a small bending radius.

BACKGROUND

Many commercial passenger aircraft use bypass gas turbine engines for propulsion. In a bypass turbine engine, ambient air enters an engine inlet and is pressurized and accelerated rearwardly by a fan located near the inlet. A relatively small portion of the pressurized air from the fan is passed into a core engine where the air is mixed with fuel and ignited causing combustion and expansion of the fuel-air mixture. The expansion of the fuel-air mixture rotatably drives the fan. The discharge of the combustion gas from the exhaust nozzle adds to the propulsive thrust of the gas turbine engine. A relatively large portion of the pressurized air from the fan passes through a fan duct that surrounds the core engine. The air exiting the fan duct may provide a significant portion of the propulsive thrust of the gas turbine engine.

In certain bypass turbine engines such as those having thrust reversers, the fan duct is bifurcated or divided by a pair of inner walls into two semi-circular fan ducts. Each one of the inner walls may include a semi-circular barrel portion that generally surrounds the core engine. The inner wall may also include an upper wall portion and a lower wall portion extending radially from circumferential ends of the barrel portion. The upper and lower wall portion may be coupled to diametrically-opposite sides (e.g., upper and lower sides) of a fan duct outer wall (e.g., a fan reverser cowl). The bifurcated fan duct arrangement provides improved accessibility to the engine interior for inspection and maintenance.

The operating efficiency and performance of a gas turbine engine may be enhanced by improving the aerodynamics of the airflow through the fan duct. For example, the fuel efficiency of a gas turbine engine may be improved by minimizing or eliminating protrusions in the wetted airflow surface of the fan duct. In addition, the specific performance of the gas turbine engine may be improved by minimizing the weight of the engine components such as the weight of the fan duct inner walls and outer walls. Furthermore, the noise output of a gas turbine engine may be reduced by acoustically treating the wetted surface area of the fan duct that is exposed to the airflow.

In view of the foregoing, there exists a need in the art for a system and method improving the aerodynamics of the fan duct of a gas turbine engine and for reducing the weight of the fan duct components such that the performance of the engine may be improved. In addition, there exists a need in the art for a system and method for increasing the amount of fan duct wetted surface area that can be acoustically treated as a means for increasing the capacity for effecting noise reduction in the gas turbine engine.

SUMMARY

The above-noted needs associated with the specific performance and noise output of gas turbine engines are specifically addressed by the present disclosure which provides an acoustic-attenuating inner wall panel for a nacelle of a turbine engine. The inner wall panel may include a radiused portion having an airflow surface with a concave configuration. The radiused portion may be exposed to an airflow passing through the nacelle. The radiused portion may include an acoustic attenuating section for attenuating noise associated with the airflow.

Also disclosed is an inner wall panel, comprising a semi-circular barrel portion upper and lower bifurcation wall portions, and upper and lower radiused portions. The barrel portion may have circumferentially opposite ends. The upper bifurcation wall portion and the lower bifurcation wall portion may be oriented generally radially outwardly from the circumferentially opposite ends of the barrel portion. The upper and the lower radiused portions may join the respective upper and lower bifurcation wall portions to the circumferentially opposite ends of the barrel portion such that the inner wall panel is formed as a metallic, one-piece, unitary structure.

In a further embodiment, disclosed is an aircraft having a nacelle that may be connected to or associated with a turbine engine. The nacelle may have an inner wall panel positioned along a duct airflow path of an airflow passing through the nacelle. The inner wall panel may have a radiused portion including an airflow surface having a concave configuration. The radiused portion may comprise an acoustic attenuating section for attenuating noise associated with the airflow.

Also disclosed is a method of attenuating noise of a turbine engine. The method may include passing an airflow along a concave airflow surface of a radiused portion of an inner wall panel positioned within a nacelle. The radiused portion may comprise a honeycomb sandwich structure. The honeycomb sandwich structure may include a honeycomb core having a plurality of cells. The method may include fluidly coupling the cells to the fan duct airflow using a plurality of holes formed in an airflow face sheet of the honeycomb sandwich structure, and absorbing acoustic energy from the airflow entering the cells.

The features, functions and advantages that have been discussed above can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 7 is a sectional view of the inner wall panel taken along line 7 of FIG. 5 and illustrating the one-piece, unitary structure of the inner wall panel formed as a honeycomb sandwich structure;

FIG. 8 is a sectional view of the upper radiused portion formed as a honeycomb sandwich structure;

FIG. 9 is a sectional view of the upper radiused portion taken along line 9 of FIG. 8 and illustrating the honeycomb sandwich structure having a pair of face sheets and a honeycomb core interposed between the face sheets;

FIG. 10 is a top view of the upper radiused portion taken along line 10 of FIG. 9 and illustrating the porous configuration of one of the face sheets for fluidly coupling the honeycomb cells to the airflow passing through bifurcated fan duct;

DETAILED DESCRIPTION

Figure 1:
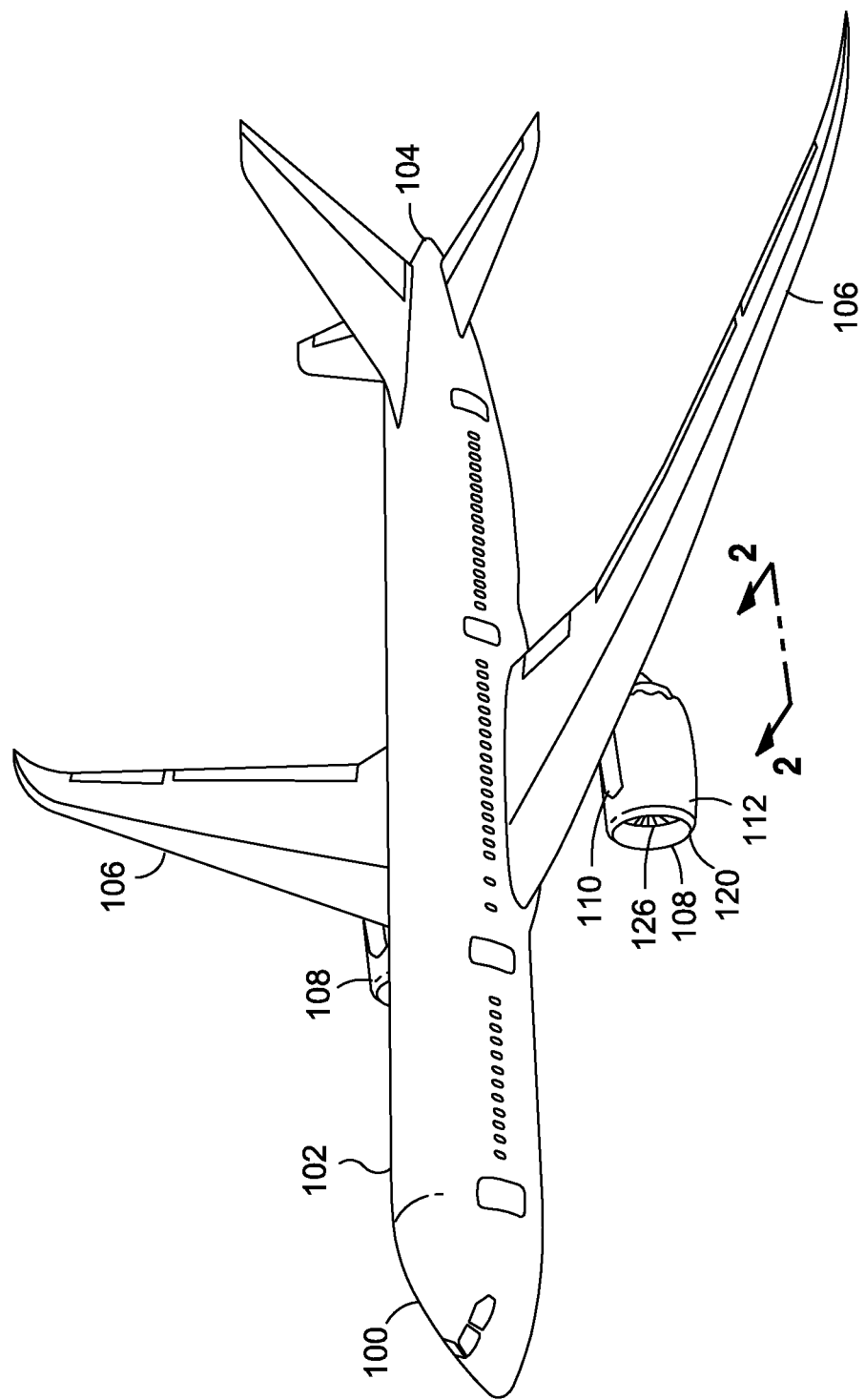
FIG. 1 is a perspective view of an aircraft.

Referring now to the drawings wherein the showings are for purposes of illustrating various embodiments of the present disclosure, shown in FIG. 1 is a perspective illustration of an aircraft 100 which may include one or more gas turbine engines 108 that may incorporate an acoustic-attenuating wall panel 160 as disclosed herein. The aircraft 100 may include a fuselage 102 which may extend from a nose at a forward end of the aircraft 100 to an empennage 104 at an aft end of the aircraft 100. The empennage 104 may include one or more tail surfaces for directional control of the aircraft 100. The aircraft 100 may further include a pair of wings 106 and a pair of gas turbine engines 108 that may be mounted to the wings 106 by struts 110 or pylons.

Although the inner wall panel 162 of the present disclosure is described in the context of a fixed wing passenger aircraft such as the tube-and-wing aircraft 100 illustrated in FIG. 1, embodiments of the inner wall panel 162 may be applied to any aircraft of any configuration, without limitation. In this regard, the inner wall panel 162 may be applied to any civil, commercial, or military aircraft. In addition, embodiments of the inner wall panel 162 disclosed herein may be applied to alternative aircraft configurations and are not limited to the tube-and-wing aircraft 100 configuration illustrated in FIG. 1. For example, the disclosed embodiments may be applied to hybrid wing-body aircraft or blended-wing aircraft. The disclosed embodiments are not limited to implementation in fixed-wing aircraft and may be applied to rotorcraft. Furthermore, the disclosed embodiments are not limited to aircraft. In this regard, the disclosed embodiments of the inner wall panel 162 may be implemented in any vehicle of any type, without limitation, including in any marine vessel, land-based vehicles, air vehicles, and/or space vehicles, or any combination thereof. The disclosed embodiments of the inner wall panel 162 may also be implemented in any non-vehicular application.

Figure 2:
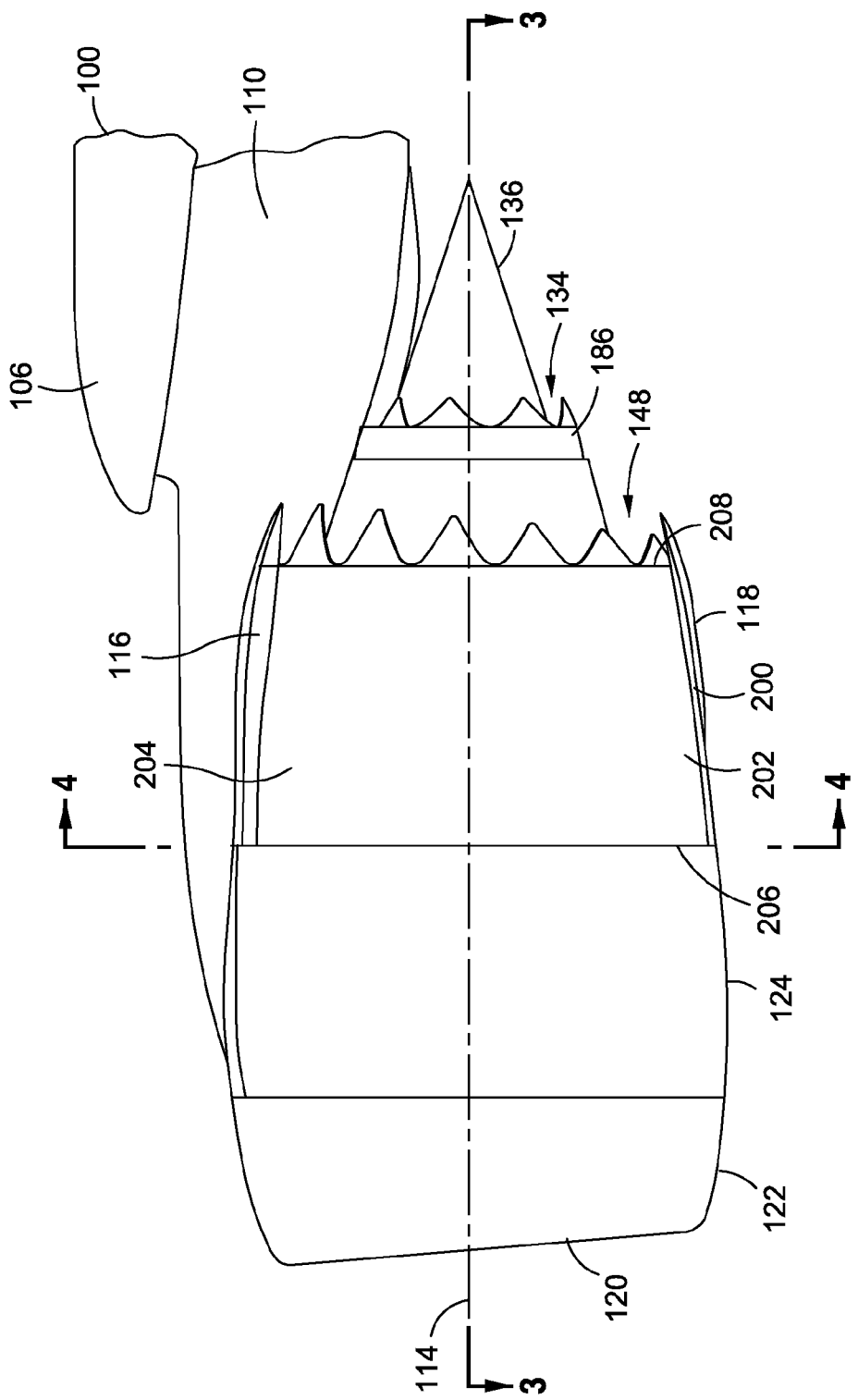
FIG. 2 is a side view of a gas turbine engine taken along line 2 of FIG. 1 and wherein the gas turbine engine may include a nacelle having one or more acoustic-attenuating inner wall panels as disclosed herein.
Figure 3:
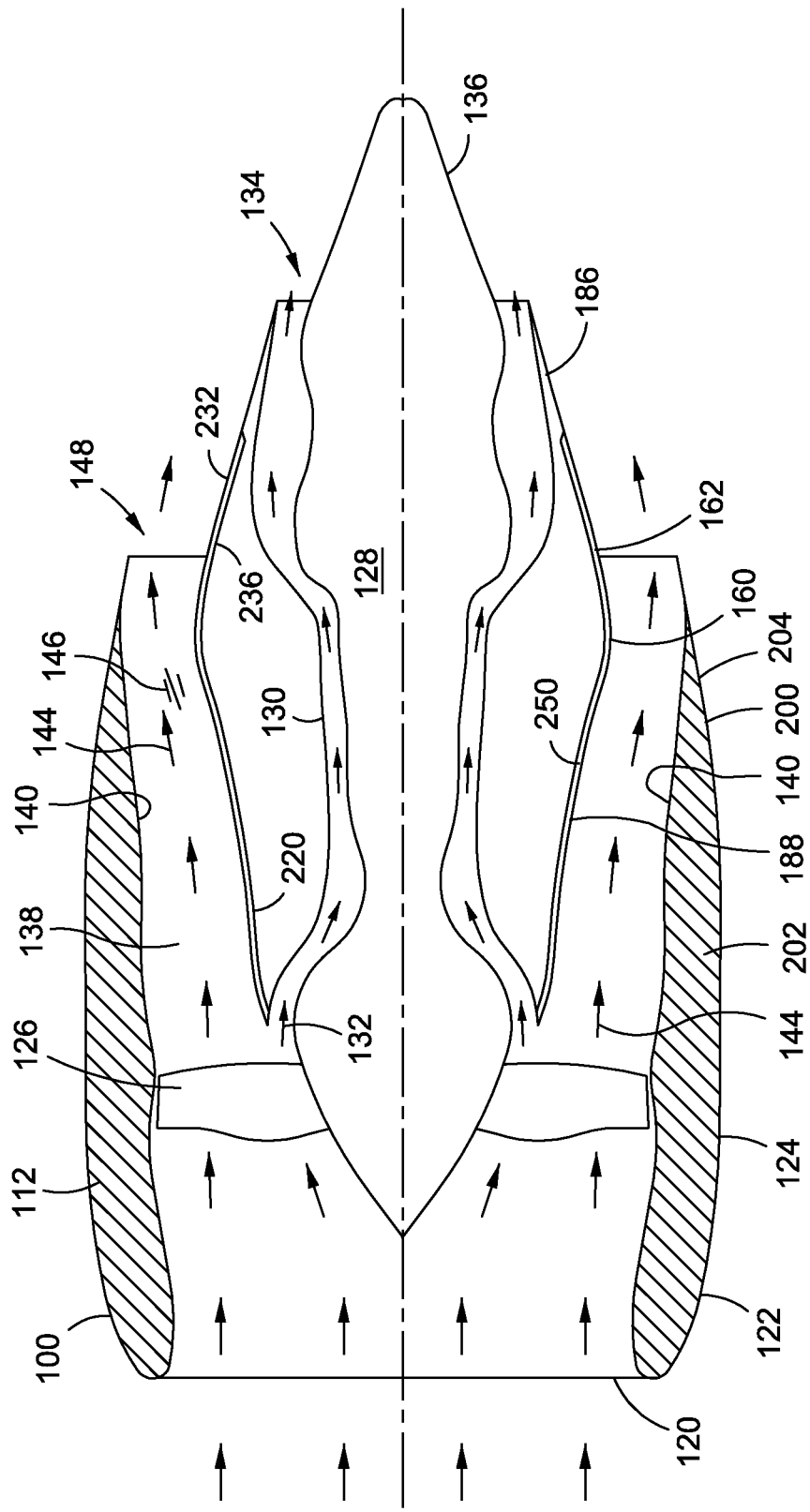
FIG. 3 is a sectional view of the gas turbine engine taken along line 3 of FIG. 2 and illustrating an airflow moving through a bifurcated fan duct of the gas turbine engine and further illustrating the airflow passing along an airflow surface of the inner wall panels.

Referring to FIG. 2, shown is a side view of a gas turbine engine 108. The gas turbine engine 108 may include a nacelle 112 that may be coupled to the aircraft 100 wing 106 by the strut 110 as mentioned above. The gas turbine engine 108 may include an inlet 120 defined by an inlet cowl 122 located at a forward end of the gas turbine engine 108. The gas turbine engine 108 may also include a fan cowl 124 for housing a fan 126 (FIG. 3). The fan 126 may pressurize air entering the inlet 120 and may accelerate an airflow 144 rearwardly through the bifurcated fan ducts 138 (FIG. 4) of the nacelle 112.

In FIG. 2, the gas turbine engine 108 may also include a thrust reverser assembly 200 having fan reverser cowls 202 including translating sleeve(s) 204 configured to move forward and aft for thrust reversal. Each one of the translating sleeves 204 may have a sleeve forward end 206 and a sleeve aft end 208. The sleeve forward end 206 may abut the fan cowl 124. The sleeve aft end 208 and the aft cowl 186 may collectively form a fan nozzle 148 for the bifurcated fan ducts 138. The fan reverser cowls 202 may be supported by a hinge beam 116 on a top of the nacelle 112 and a latch beam 118 on a bottom of the nacelle 112 to allow the fan reverser cowls 202 to be pivoted upwardly about the hinge beam 116 for access to the engine interior for inspection or maintenance. The gas turbine engine 108 may include a primary exhaust nozzle 134 at an aft end of the gas turbine engine 108. The primary exhaust nozzle 134 may be defined by the aft cowl 186 and a primary exhaust plug 136.

Referring to FIG. 3, shown is a horizontal cross-sectional view of the gas turbine engine 108 illustrated in FIG. 2. In FIG. 3, the fan 126 may be housed within the fan cowl 124. The fan 126 may be mounted to a shaft (not shown) extending forward from the core engine 128. The core engine 128 may be housed within an engine core cowl 130. The fan 126 may be rotatable about the engine longitudinal axis 114 for drawing air into the inlet 120 and pressurizing and/or accelerating the air rearwardly through the fan duct. A portion of the air may pass through a core flow path 132 and may enter the core engine 128 where the air may be mixed with fuel and ignited causing combustion thereof. Combustion gas may be discharged through the primary exhaust nozzle 134.

Figure 5:
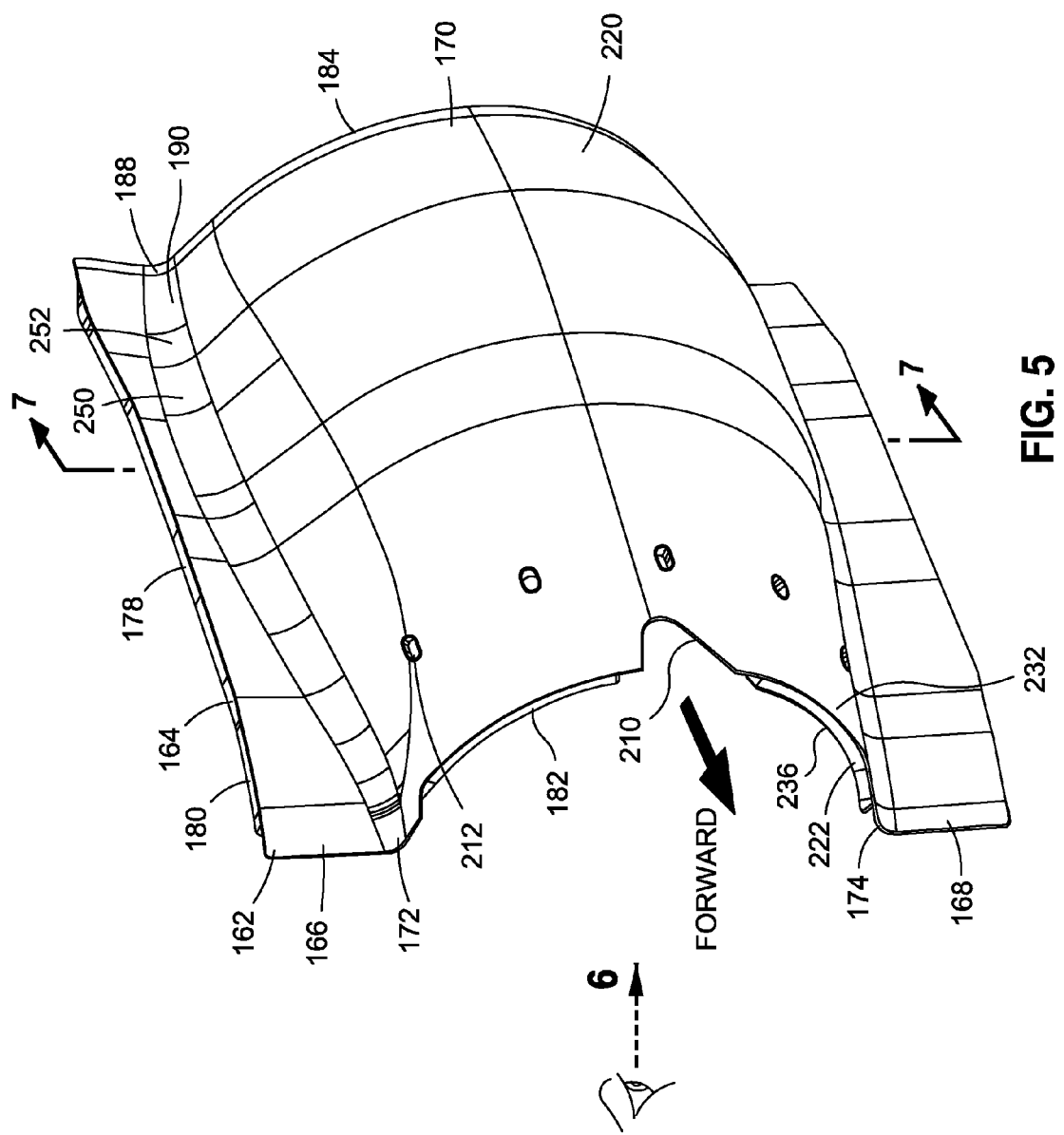
FIG. 5 is a perspective view of an airflow surface of one of the inner wall panels taken along line 5 of FIG. 4 and illustrating upper and lower radiused portions joining respective upper and lower bifurcation wall portions to a semi-circular barrel portion to form the inner wall panel as a one-piece, unitary structure.

In FIG. 3, the airflow 144 pressurized by the fan 126 may flow rearwardly through the bifurcated fan ducts 138 located on opposite sides of the gas turbine engine 108. Each one of the bifurcated fan ducts 138 may be defined by a semi-circular outer wall 140 (e.g., a fan reverser cowl 202) and an inner wall panel 162. Each one of the inner wall panels 162 may be positioned along (e.g., oriented generally parallel to) a duct airflow path 146 of the airflow 144. The aft cowl 186 may be mounted to the inner wall panel aft end 184 (FIG. 5). The inner wall panel 162 may have an axial contour 178 (FIG. 5) along a direction of the longitudinal axis 114 of the gas turbine engine 108. The axial contour 178 of the inner wall panel 162 may comprise a compound curvature of varying radii in the inner wall panel 162. The inner wall panel 162 may have an airflow surface 188 that may be exposed to the airflow 144 moving along the duct airflow path 146.

Figure 4:
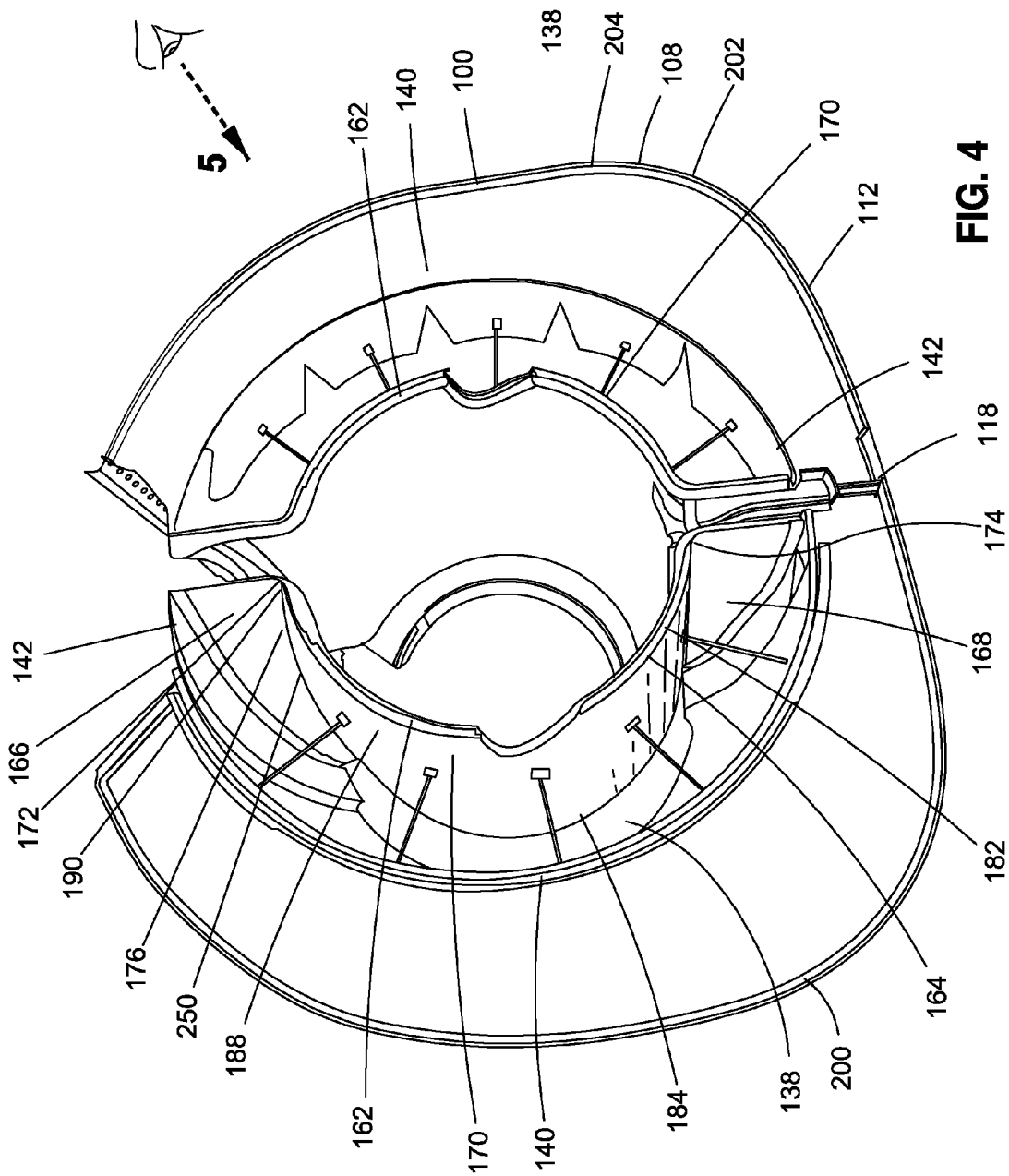
FIG. 4 is a view looking aft at the gas turbine engine taken along line 4 of FIG. 2 and illustrating the connection of each one of the inner wall panels with an outer wall of the nacelle to define the bifurcated fan duct of the gas turbine engine.

Referring to FIG. 4, shown is a view looking aft at a portion of the gas turbine engine 108 and illustrating the inner wall panels 162 extending between upper and lower sides or surfaces of the semi-circular outer walls 140. In an embodiment, each one of the inner wall panels 162 may extend between circumferentially opposite sides 142 (e.g., between the upper side and the lower side) of the outer wall 140. The inner wall panels 162 may generally be formed as mirror images of one another and may include a semi-circular barrel portion 170 having a substantially vertically-oriented, generally planar upper bifurcation wall portion 166 and a substantially vertically-oriented, generally planar lower bifurcation wall portion 168. However, the upper and lower bifurcation wall portions 166, 168 may be provided in a non-planar configuration and may be oriented at any angle relative to the barrel portion 170 of the inner wall panel 162. The upper and lower bifurcation wall portions 166, 168 may extend radially outwardly (e.g., radially upwardly and radially downwardly) from circumferentially opposite ends of the barrel portion 170.

In FIG. 4, each inner wall panel 162 may advantageously include an upper radiused portion 172 and a lower radiused portion 174 for joining the upper and lower bifurcation wall portions 166, 168 to the barrel portion 170. The upper radiused portion 172 and the lower radiused portion 174 provide a means for transitioning the barrel portion 170 to the upper and lower bifurcation wall portions 166, 168 in an aerodynamically smooth and contiguous manner. In this regard, the upper radiused portion 172 and the lower radiused portion 174 provide a means for forming the inner wall panel 162 as a one-piece, unitary structure 164 without the need for a mechanical joint (not shown) at a juncture of the barrel portion 170 with the upper and lower bifurcation wall portions 166, 168.

Referring to FIG. 5, shown is the inner wall panel 162 formed as a unitary structure 164. The upper and lower radiused portions 172, 174 may extend from an inner wall panel forward end 182 to an inner wall panel aft end 184. Each one of the upper and lower radiused portions 172, 174 includes an airflow surface 188 having a concave configuration 190 that is exposed to the airflow 144. The upper and lower radiused portions 172, 174 may be formed in a double contour 180 including an axial contour 178 along an axial direction (e.g., parallel to the longitudinal axis 114) of the nacelle 112, and the contour of the inner radius 176 along the radial direction of the nacelle 112.

Figure 6:
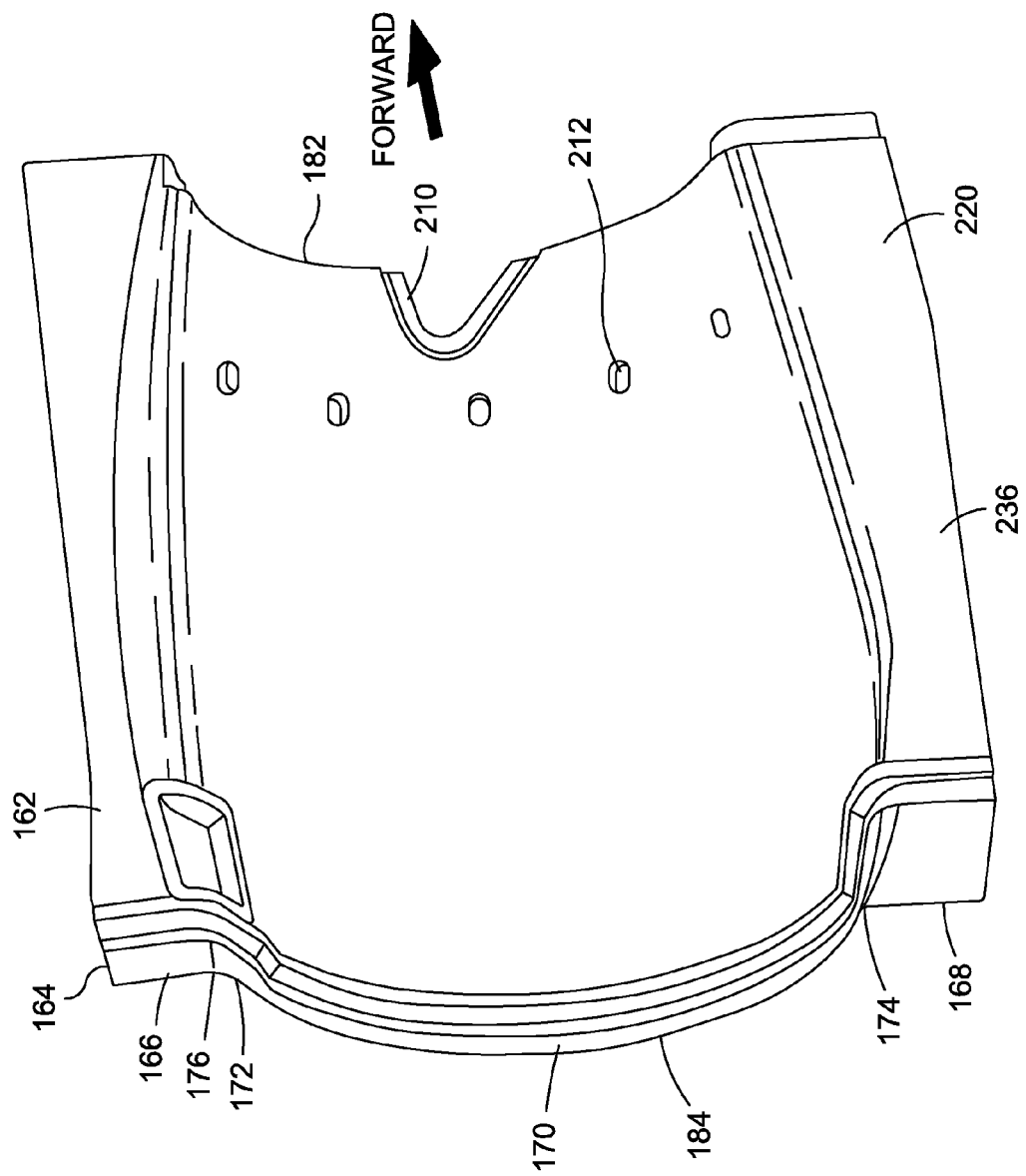
FIG. 6 is a perspective view of a non-airflow side of the inner wall panel of FIG. 5.

Referring to FIG. 6, shown is a non-airflow side of the inner wall panel 162. The non-airflow side of the inner wall panel 162 comprises the side of the inner wall panel 162 that is not directly exposed to the airflow 144 passing through the bifurcated fan duct 138. The inner wall panel 162 may include one or more features for interfacing with other systems associated with the gas turbine engine 108. For example, the inner wall panel 162 may include one or more features for interfacing with a thrust reverser actuation system (not shown). In this regard, the inner wall panel 162 may include one or more drag link fitting cutouts 212 that may be locally formed in the inner wall panel 162 as part of the thrust reverser actuation system. In addition, the inner wall panel 162 may include one or more notches or cutouts 210 that may be formed in the inner wall panel forward end 182 for the pass-through of one or more systems associated with the turbine engine 108.

Referring to FIGS. 5-6, in an embodiment, the inner wall panel 162 may advantageously be formed as a metallic, one-piece, unitary structure 164. In an embodiment, the inner wall panel 162 may be formed with one or more parts of the inner wall panel 162 comprising a metallic honeycomb sandwich structure 220. For example, the upper and/or the lower radiused portion 172, 174 may be separately-formed as a metallic honeycomb sandwich structure 220. Other portions such as the barrel portion 170 and/or the upper and/or lower bifurcation wall portions 166, 168 of the inner wall panel 162 may also be separately-formed of metallic honeycomb sandwich structure and joined with the upper and the lower radiused portion 172, 174 such as by welding or brazing together to form a one-piece, unitary structure 164. Alternatively, it is contemplated that the upper and/or the lower radiused portion 172, 174, the barrel portion 170, and/or the upper and lower bifurcation wall portions 166, 168 may be initially formed as a contiguous, one-piece, unitary structure. For example, the inner wall panel 162 may be initially formed as a contiguous, one-piece, unitary, metallic honeycomb sandwich structure 220.

Figure 13:
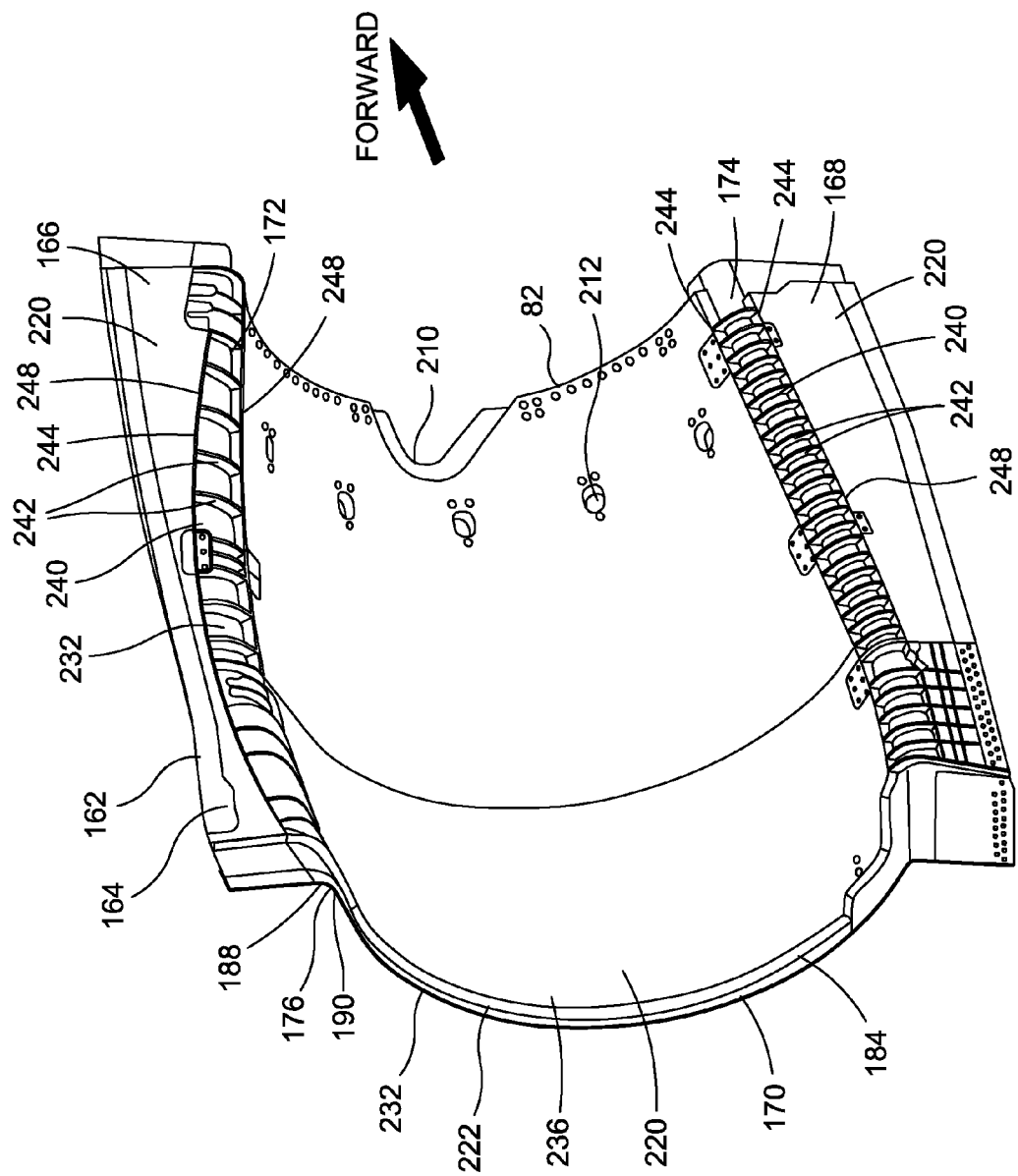
FIG. 13 is a perspective view of an embodiment of an inner wall panel wherein the upper and lower radiused portions comprise an integral ribbed structure.
Figure 15:
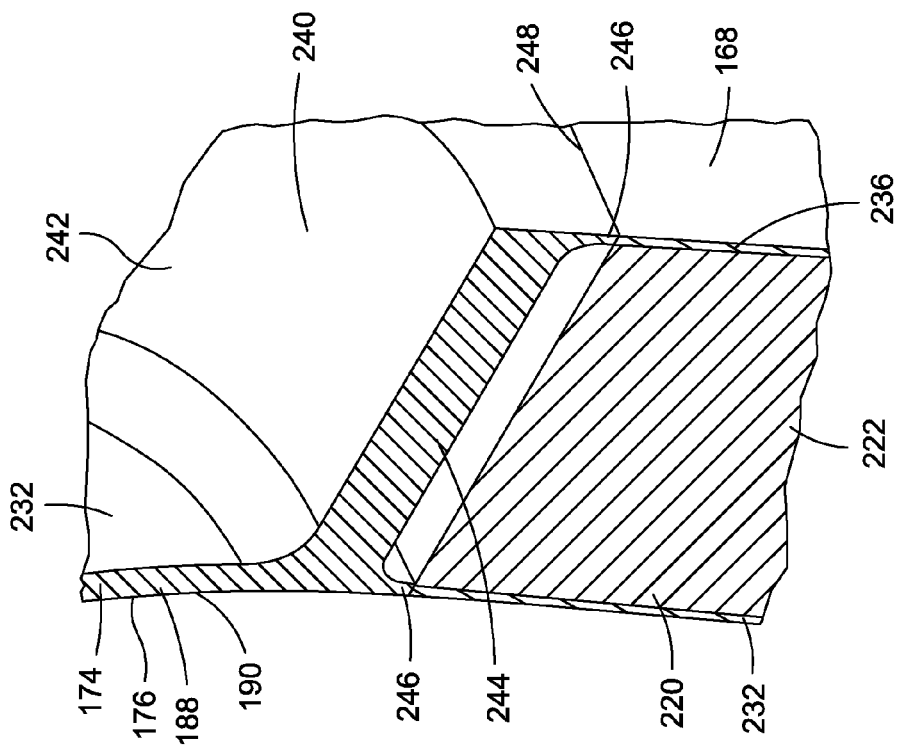
FIG. 15 is an enlarged view of an edge portion of the integral ribbed structure joined to the face sheets of the lower bifurcation wall portion.
Figure 14:
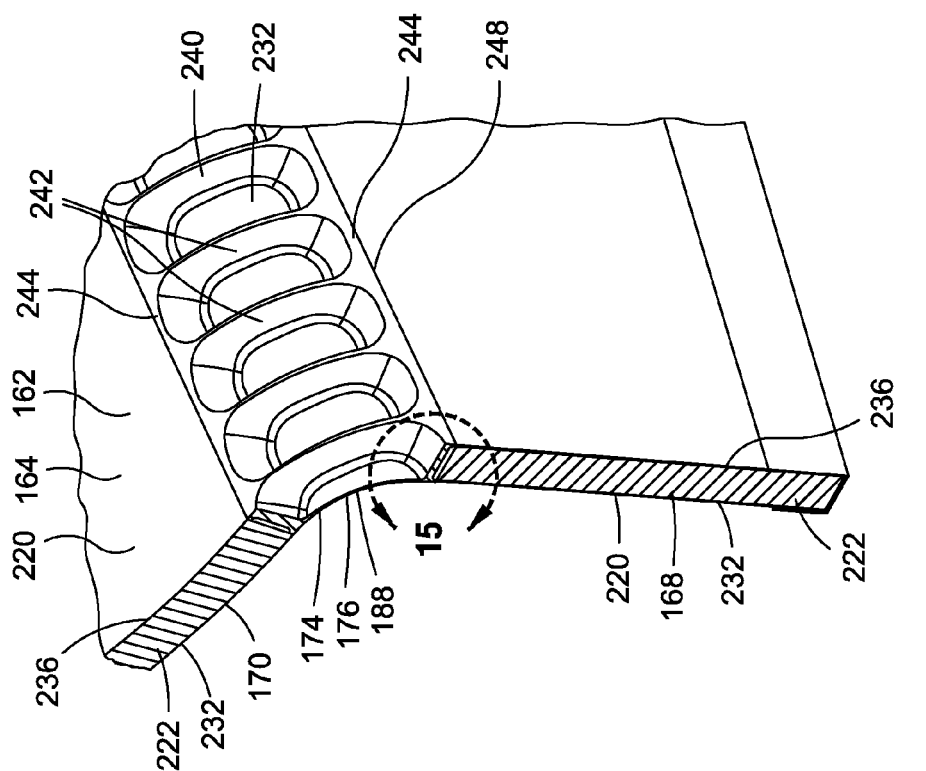
FIG. 14 is a perspective view of a section of the inner wall panel taken along line 14 of FIG. 13 and illustrating the integral ribbed structure of the lower radiused portion connecting the barrel portion to the lower bifurcation wall portion.

In an embodiment described in greater detail below, the upper and/or the lower radiused portion 172, 174 may optionally be separately-formed as an integral ribbed structure 240 as shown in FIGS. 13-15 as an alternative to forming the upper and/or the lower radiused portion 172, 174 of metallic honeycomb sandwich structure 220. However, in embodiments where the upper and/or the lower radiused portion 172, 174 are formed as an integral ribbed structure 240 instead of a honeycomb sandwich structure 220, one or more of the remaining portions of the upper and/or the lower radiused portion 172, 174 such as the barrel portion 170 or the upper and/or lower bifurcation wall portions 166, 168 may be separately-formed of metallic honeycomb sandwich structure 220 and then joined to the integral ribbed structure 240 of the upper and/or the lower radiused portion 172, 174 such as by brazing and/or welding together along weld seams 248 (FIG. 13) to form a final, one-piece, unitary structure 164 as shown in FIG. 13 and described below.

Referring still to FIGS. 5-6, forming the inner wall panel 162 as a unitary structure 164 may provide several significant advantages relative to a multi-piece inner wall panel (not shown) requiring additional fittings (not shown) and mechanical fasteners (not shown) to join the barrel portion 170 to the upper and lower bifurcation wall portions 166, 168. For example, forming the inner wall panel 162 as a unitary structure 164 may provide weight savings for the gas turbine engine 108. In addition, forming the inner wall panel 162 as a unitary structure 164 may reduce the part count which may improve the manufacturing produce-ability of the inner wall panel 162. Furthermore, forming the inner wall panel 162 as a unitary structure 164 may result in an increase in the operational life or fatigue life of the inner wall panel 162 relative to a multi-piece inner wall panel (not shown). Even further, forming the inner wall panel 162 as a unitary structure 164 may avoid clearance issues between the engine and the thrust reverser assembly 200. In this regard, forming the inner wall panel 162 as a unitary structure 164 may provide additional packaging space for the various systems and structures that may be routed within the relatively small space between the inner wall panel 162 and the core engine 128.

In addition, the upper and lower radiused portions 172, 174 may advantageously be formed at a relatively small inner radius 176 which may provide for improved aerodynamics of the bifurcated fan ducts 138 by maximizing the cross-sectional area of the bifurcated fan ducts 138 relative to a smaller cross-sectional area that would be associated with a bifurcated fan duct having a radiused portion formed at a relatively large radius (not shown). Furthermore, the upper and lower radiused portions 172, 174 of the inner wall panels 162 may provide an aerodynamically smooth transition from the upper and lower bifurcation wall portions 166, 168 to the semicircular barrel portion 170 which may improve the aerodynamics flow characteristics of the airflow 144 that is passing through the bifurcated fan ducts 138. Improved aerodynamics of the bifurcated fan ducts 138 may result in an increase in the operational efficiency of the gas turbine engine 108.

Referring still to FIGS. 5-6, the upper radiused portion 172 and/or the lower radiused portion 172, 174 of each one of the inner wall panels 162 may be formed as a metallic honeycomb sandwich structure 220 as mentioned above. The metallic honeycomb sandwich structure 220 may include a metallic core 222 having a plurality of tubular cells 226 (FIG. 10) and a pair of metallic face sheets 232, 236 on opposite sides of the core 222. The upper radiused portion 172 and/or the lower radiused portion 172, 174 may be formed such that the face sheet that is exposed to the airflow 144 (e.g., the airflow face sheet 232—FIG. 7) may have a relatively small inner radius 176 (FIG. 8). In addition, the upper radiused portion 172 and/or the lower radiused portion 172, 174 may have a porous configuration 252. The porous configuration 252 of the airflow face sheet 232 may facilitate fluid coupling of the cells 226 to the airflow 144 such that the upper radiused portion 172 and/or the lower radiused portion 172, 174 may operate as an acoustic attenuating section of the inner wall panel 162.

Advantageously, the upper and lower radiused portions 172, 174 may provide increased acoustic attenuation capability to the inner wall panel 162 relative to the acoustic attenuation capability of radiused portions (not shown) that lack a porous configuration. The upper and lower radiused portions 172, 174 may provide a significant increase in the overall noise-attenuation capability of an inner wall panel 162 wherein the barrel portion 170 and/or the upper and/or lower bifurcation wall portions 166, 168 may also be provided with face sheets 232, 236 having a porous configuration 252. In this regard, the upper and lower radiused portions 172, 174 may provide a greater amount of acoustic attenuation per unit wetted surface area than the acoustic attenuation per unit wetted surface area provided by the barrel portion 170 or by the upper and lower bifurcation wall portions 166, 168 of the inner wall panel 162.

Referring to FIG. 7, shown is a sectional view of an embodiment of the inner wall panel 162 comprising a one-piece, unitary structure 164. In the embodiment shown, the inner wall panel 162 may comprise a metallic honeycomb sandwich structure 220 having a core 222 and face sheets 232, 236 formed of metallic material. The upper and lower radiused portions 172, 174 may be formed of metallic material capable of withstanding large temperature changes during the operational life of the gas turbine engine 108. For example, the airflow surfaces 188 of the face sheets 232, 236 of the inner wall panel 162 including the upper and lower radiused portions 172, 174 may be subjected to temperatures in the range of from approximately −40° F. (or lower) up to approximately 800-1000° F. or higher. In addition, the inner wall panel 162 including the upper and lower radiused portions 172, 174 may be formed of material(s) capable of withstanding a temperature gradient of up to approximately 400-500° F. or greater across the face sheets 232, 236 of the metallic honeycomb sandwich structure 220. In this regard, the inner wall panel 162 including the upper and/or lower radiused portion 172, 174 may have a titanium core 222 and titanium face sheets 232, 236. However, the inner wall panel 162 including the upper and/or lower radiused portion 172, 174 may be formed of titanium alloys or other metallic materials or alloys thereof. For example, the face sheets 232, 236 and/or the honeycomb core 222 may comprise steel, nickel alloys such as Inconel™, and other alloys.

Referring to FIG. 8, shown is a sectional view of an embodiment of the upper radiused portion 172 formed of honeycomb sandwich structure 220. The upper radiused portion 172 is advantageously configured to provide a smooth transition from the barrel portion 170 to the upper bifurcation wall portion 166 in an aerodynamically smooth and contiguous manner. As indicated above, the upper radiused portion 172 may be formed as a separate component and may be later joined to the upper bifurcation wall portion 166 and the barrel portion 170 such as by brazing, welding, or by other means for seamlessly interconnecting the upper bifurcation wall portion 166 to the barrel portion 170. The lower radiused portion may be formed and assembled to the barrel portion 170 in a manner similar to the upper radiused portion 172.

In FIG. 8, the upper radiused portion 172 is advantageously formed at a relatively small inner radius 176 as defined by the airflow face sheet 232. The core 222 may be formed at a core thickness 224 that is generally constant without significant variation in core height between the circumferential ends of the upper radiused portion 172. In an embodiment, the metallic honeycomb sandwich structure 220 of the upper radiused portion 172 and/or lower radiused portion 174 may be formed at an inner radius/core thickness ratio of no less than approximately 2:1. For example, for a core thickness 224 of approximately 1.0 inch, the airflow face sheet 232 may be formed at an inner radius 176 of no less than approximately 2.0 inches. In an embodiment, the upper radiused portion 172 and/or the lower radiused portion 174 may be formed at an inner radius/core thickness ratio of between approximately 2:1 and 4:1. However, the upper radiused portion 172 and/or the lower radiused portion 174 may be formed at any inner radius/core thickness ratio, without limitation. In the context of a gas turbine engine 108, the upper radiused portion 172 and/or the lower radiused portion 174 may have a honeycomb core 222 with a core thickness 224 of no less than approximately 0.25 inch. For example, the core thickness 224 of the upper radiused portion 172 and/or the lower radiused portion 174 may be in the range of from approximately 0.25 inch to 1.50 inches. However, the honeycomb core 222 may be provided in any thickness, without limitation.

Referring to FIG. 9, shown is the honeycomb sandwich structure 220 of the upper radiused portion 172 and illustrating the honeycomb core 222 comprising a plurality of tubular cells 226 oriented generally perpendicular to the face sheets 232, 236. The face sheets 232, 236 of the honeycomb sandwich structure 220 may be provided in a face sheet thickness 234, 238 of at least approximately 0.015 inch. For example, each face sheet 232, 236 may be provided in a face sheet thickness 234, 238 in the range of from approximately 0.030 to 0.050 inch. However, each one of the face sheets 232, 236 may be provided in any face sheet thickness 234, 238, without limitation, including face sheet thicknesses 234, 238 of less than 0.015 inch or greater than 0.050 inch. Furthermore, the face sheets 232, 236 on opposite sides of the core engine 128 may be provided in different face sheet thicknesses 234, 238 and are not necessarily required to have the same face sheet thickness 234, 238. The airflow face sheet thickness 234 may be selected as a function of the inner radius 176 of the airflow face sheet 232. For example, a relatively small inner radius 176 of the upper radiused portion 172 or a porous configuration of the airflow face sheet 232 may dictate a relatively thicker face sheet thickness 234.

In FIG. 9, the airflow face sheet 232 may be provided with a porous configuration 252 including a plurality of holes 254. The porous configuration 252 of the airflow face sheet 232 may facilitate fluid communication between the airflow 144 and the interior of the cells 226 for acoustic attenuation purposes as described in greater detail below. In an embodiment, the core 222 may optionally be provided in a slotted configuration (not shown) at the interface between the core 222 and the non-airflow face sheet 236. The slotted configuration of the core 222 may facilitate drainage of fluid from the cells 226 to avoid corrosion that may otherwise occur from trapped fluids in the cells 226 such as water due to rain, or other fluids such as jet fuel or hydraulic fluid.

Referring to FIG. 10, shown is plan view of the upper radiused portion 172 illustrating the cells 226 of the honeycomb core 222 and the porous configuration 252 of the airflow face sheet 232. Although the cells 226 of the honeycomb core 222 are shown in a hexagonal shape, the core 222 may be provided with cells 226 having any one of a variety of different cross-sectional shapes including, but not limited to, orthogonal shapes such as a square or a rectangular shape, or other shapes such as a triangular shape. The shape of the cells 226 may be selected based on the acoustic attenuation characteristics that may be desired. In addition, the shape of the cells 226 may be selected in consideration of the size of the inner radius 176 and the variation in curvature along an axial length of the upper radiused portion 172 and/or lower radiused portion 174. For example, the core 222 may be selected with a cell geometry that is conducive to forming the core 222 at a relatively small inner radius 176 along the radial direction and a relatively large or negligible curvature radius along the axial direction of the upper and/or lower radiused portion 172, 174.

In the same regard, the cell width 228 of the cells 226 in the core 222 may be selected based upon acoustic considerations, manufacturability, and other factors. In an embodiment, the upper radiused portion 172 and/or lower radiused portion 174 may be provided with a core 222 having a cell width 228 in the range of from approximately 0.25 to 1.0 inch. However, the core 222 may be provided with a cell width 228 that is smaller than 0.25 or larger than 1.0 inch. In an embodiment, the cell width 228 may be in the range of from approximately 0.25 and 0.50 inch. For example, the core 222 may be provided with a cell width 228 of approximately 0.38 inch. Each cell 226 may be enclosed by cell walls that may have a relatively small thickness. For example, the core 222 may be formed of a foil having a foil thickness 230 of between approximately 0.001 and 0.010 inch or larger.

In FIG. 10, the airflow face sheet 232 may have a porous configuration 252 to facilitate fluid communication between the cells 226 and the airflow 144 passing through the bifurcated fan duct 138. The non-airflow face sheet 236 located opposite the airflow face sheet 232 may be non-porous or solid. The holes 254 in the airflow face sheet 232 may have a combined cross-sectional area that is in the range of from approximately 3 percent to 20 percent of the total surface area of the airflow face sheet 232 without the holes 254. In an embodiment, the holes 254 may have a combined cross-sectional area that is in the range of from approximately 4 to 16 percent. The selection of the combined cross-sectional area the holes 254 may be based upon acoustic considerations. In an embodiment, the holes 254 may have a combined cross-sectional area in the range of approximately 8 percent.

In FIG. 10, although the holes 254 are shown as being generally circularly-shaped, the porous configuration 252 of the airflow face sheet 232 may be achieved using holes 254 of any configuration and are not limited to circular holes 254. For example, the holes may be formed as slots or in any one of a variety of other shapes. In an embodiment, the holes 254 may have a hole diameter 256 in the range of from approximately 0.010 inch to 0.100 inch. For example, the holes 254 may have a hole diameter 256 in the range of from approximately 0.070 to 0.080 inch. In a further embodiment, the holes 254 may have a hole diameter 256 of approximately 0.040 inch. The selection of the hole diameter 256 may be based upon acoustic considerations. Although the holes 254 are shown as having a substantially uniform spacing, the holes 254 may be provided in any spacing including a non-uniform spacing or a spacing that may be locally varied or tailored to provide a desired acoustic attenuation capability at a given location within each bifurcated fan duct 138. As indicated above, the holes 254 may be provided in any size, shape, and spacing, without limitation. In this regard, the holes 254 and the cells 226 may be sized and configured to attenuate acoustic energy of the airflow 144 passing through the bifurcated fan duct 138 as a means to reduce the turbine engine 108 noise levels at desired frequencies. Furthermore, the airflow face sheet 232 may comprise a wire mesh (not shown). In addition, the airflow face sheet 232 may have a layered construction such as a perforated sheet (not shown) with wire mesh on top of or below the perforated sheet, or a stack of perforated sheets and wire mesh or other materials (e.g., sintered felt) arranged in any one of a variety of different layered configurations (not shown).

Figure 11:
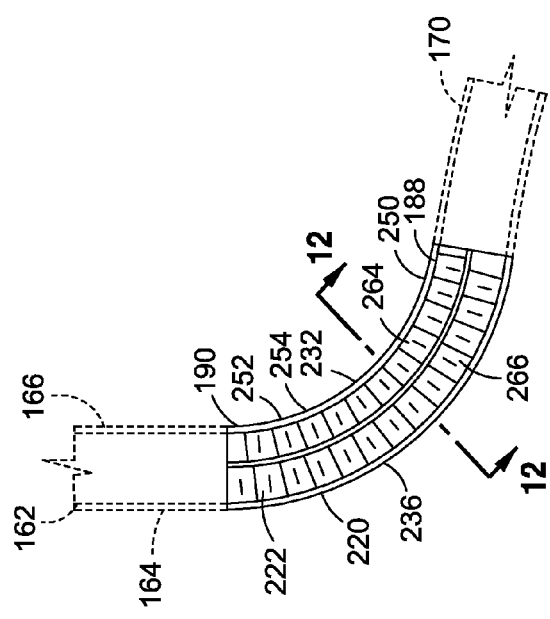
FIG. 11 is a sectional view of an alternative embodiment of the upper radiused portion wherein the honeycomb sandwich structure includes a perforated septum.

Referring to FIG. 11, shown is sectional view of an alternative embodiment of the upper radiused portion 172 wherein the honeycomb sandwich structure 220 may include a septum 258 for acoustic attenuation purposes. The septum 258 may also be incorporated into the lower radiused portion 174 or into any other area of the inner wall panel 162. The septum 258 may separate the core 222 into two separate core portions including an airflow core portion 264 located adjacent to the airflow face sheet 232 and a non-airflow core portion 266 located adjacent to the non-airflow face sheet 236.

Figure 12:
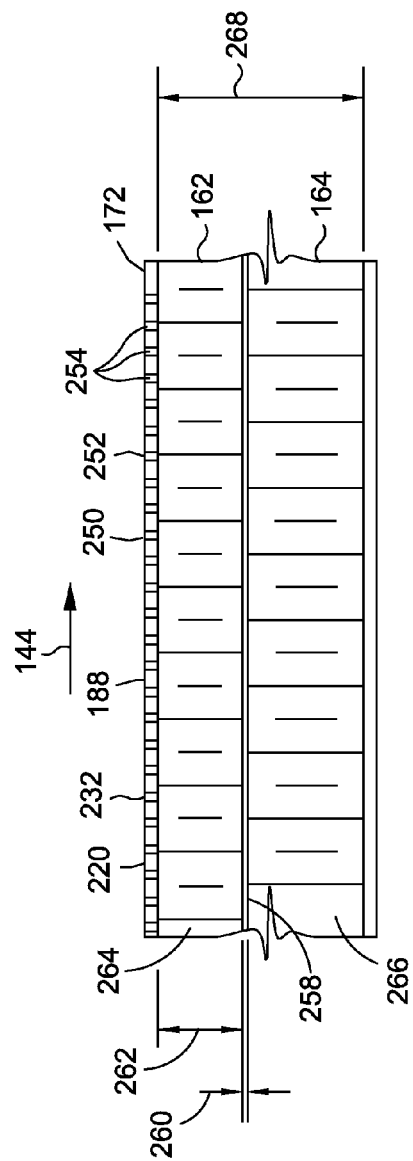
FIG. 12 is a sectional view of the alternative embodiment of the upper radiused portion taken along line 12 of FIG. 11 and illustrating the septum which may be perforated to allow for fluidly coupling an airflow core portion with a non-airflow core portion of the honeycomb sandwich structure.

Referring to FIG. 12, the septum 258 may be located at a septum depth 262 of between approximately 15 to 50 percent of the combined core thickness 268 of the honeycomb core 222. For example, the septum 258 may be located at a septum depth 262 of between approximately 20 to 30 percent (e.g., 25 percent) of the combined core thickness 268. The septum 258 may comprise a relatively thin membrane such as a foil or a wire mesh. The septum 258 may have a septum thickness 260 in the range of between approximately 0.010 and 0.030 inch. For example, the septum 258 may be provided with a septum thickness 260 of approximately the 0.018 inch.

In an embodiment, the septum 258 may be perforated such that the portion of the septum 258 in each one of the cells 226 has a plurality of relatively small perforations allowing for fluid communication between the airflow core portion 264 and the non-airflow core portion 266. In an embodiment, each one of the perforations may be laser drilled and may have a perforation width (e.g., diameter) in the range of from approximately 0.005 to 0.015 inch. In an embodiment, the perforations may have a perforation width of between approximately 0.008 and 0.010 inch. The perforations may be substantially uniformly distributed and may be provided in a width and quantity such that the perforations have a combined cross-sectional area in the range of approximately 1 to 3 percent (e.g., approximately 2 percent) of the cross-sectional area of a septum 258 without perforations. However, the septum may also be provided in a non-perforated configuration.

Referring to FIG. 13, shown is a perspective illustration of an alternative embodiment of the inner wall panel wherein the upper radiused portion 172 and/or the lower radiused portion 174 may be formed as an integral ribbed structure 240. The integral ribbed structure 240 may be configured to form a smooth transition from the circumferential ends of the barrel portion 170 to the upper bifurcation wall portion 166 and/or the lower bifurcation wall portion 168. Each integral ribbed structure 240 may include a plurality of ribs 242 that may integrally formed with an airflow face sheet as part of the integral ribbed structure 240. For example, each integral ribbed structure 240 may comprise a one-piece, frame member that may be machined or formed from metallic material. In this regard, the integral ribbed structure 240 may be machined from metal stock such as metallic bar stock or plate stock. However, the integral ribbed structure 240 may be formed using any other suitable manufacturing process for integrally forming the airflow face sheet with the plurality of ribs 242.

In the embodiment shown in FIG. 13, the ribs 242 of each integral ribbed structure 240 may be generally parallel with one another and may be oriented generally perpendicularly to the axial direction of the inner wall panel 162. However, the ribs 242 may be formed at any angle relative to one another and are not limited to being oriented perpendicular to an axial direction of the inner wall panel 162. The integral ribbed structure 240 may be devoid of a face sheet on a side opposite the integrally-formed airflow face sheet 232. The airflow face sheet 232 of the integral ribbed structure 240 may be exposed to the airflow 144 passing through the bifurcated fan duct 138 and may form an airflow surface 188 having a concave configuration 190 with a relatively small inner radius 176 similar to the concave configuration 190 illustrated in FIG. 5.

Referring to FIG. 14, shown is sectional view of the inner wall panel 162 illustrating the connection of the integral ribbed structure 240 to the barrel portion 170 and the lower bifurcation wall portion 168. In the embodiment shown, the integral ribbed structure 240 includes the plurality of ribs 242 which are shown as extending generally perpendicularly to opposing edge portions 244 on upper and lower sides of the integral ribbed structure 240. The edge portions 244 may be integrally formed with the ribs 242 and the airflow face sheet 232 of the integral ribbed structure 240. In an embodiment, the integral ribbed structure 240 may be configured such that the ribs 242 and the airflow face sheet 232 of the integral ribbed structure 240 may transfer loads between the barrel portion 170 and the upper and/or lower bifurcation wall portions 166, 168. Advantageously, by integrally forming the airflow face sheet 232, the ribs 242, and the edge portions 244 of the integral ribbed structure 240, the part count of the inner wall panel 162 may be reduced which may simplify manufacturing and assembly.

Referring to FIG. 15, shown is a joint between a lower edge portion 244 of the integral ribbed structure 240 and the lower bifurcation wall portion 168. The edge portions 244 of the integral ribbed structure 240 may be configured to facilitate joining of the integral ribbed structure 240 with the barrel portion 170 and/or the upper and lower bifurcation wall portion 166, 168. For example, each one of the edge portions 244 may be formed in a C shape cross-section having a pair of lips 246 for mating with the face sheets of the barrel portion 170 and/or the bifurcation wall portions 166, 168. The lips 246 may be sized and configured to be complementary to the face sheets 232, 236 of the barrel portion 170 and/or the bifurcation wall portions 166, 168. In this regard, the lips 246 of each one of the edge portions 244 may have a spacing therebetween that is substantially similar to the spacing between the airflow face sheet and the non-airflow face sheet of the adjoining barrel portion 170 and/or the bifurcation wall portions. In addition, each one of the lips 246 of the edge portions 244 of an integral ribbed structure 240 may have a thickness that is similar to the thickness of the corresponding to facilitate brazing or welding of each lip to the adjoining face sheet along a weld seam 248.

Figure 16:
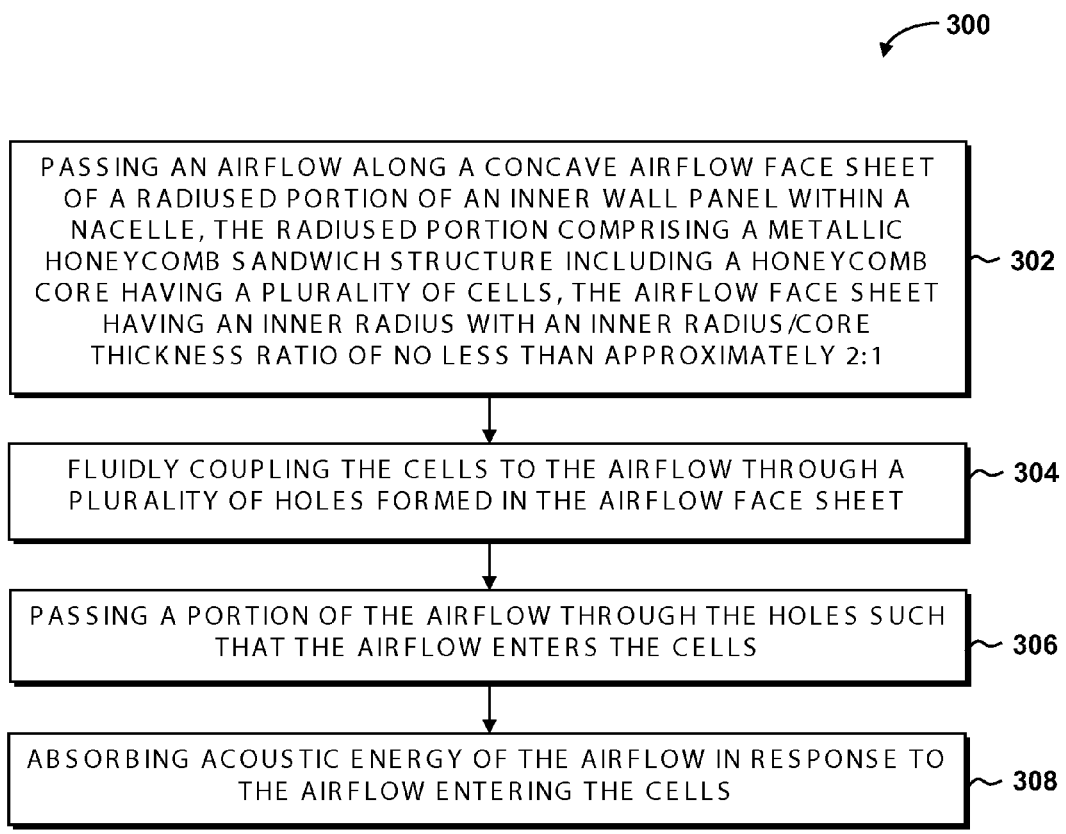
FIG. 16 is a flow diagram illustrating one or more operations that may be included in a method for attenuating noise of a turbine engine using the inner wall panel disclosed herein.

Referring to FIG. 16, shown is a flow diagram of a method of attenuating noise of a turbine engine 108 using the inner wall panel 162 incorporating the upper and lower radiused portions 172, 174 disclosed herein. As indicated above, the porous configuration 252 of the honeycomb sandwich structure 220 of the upper and lower radiused portion 172, 174 advantageously provides increased acoustic attenuation capability to the inner wall panel 162 relative to the acoustic attenuation capability of an inner wall panel (not shown) that lacks a porous configuration.

Step 302 of the method 300 of FIG. 16 may include passing the airflow 144 along the airflow surface 188 of the upper radiused portion 172 and/or lower radiused portion 174 of the inner wall panel 162 within the nacelle 112. The upper and/or lower radiused portion 172, 174 may be formed as a metallic honeycomb sandwich structure 220 having a metallic honeycomb core 222 and metallic face sheets 232, 236 as shown in FIGS. 5-12. Alternatively, the upper and/or lower radiused portion 172, 174 may be formed as a integral ribbed structure 240 as shown in FIGS. 13-15. For the embodiment of the upper and/or lower radiused portion 172, 174 formed of metallic honeycomb sandwich structure 220, the airflow face sheet 232 of the upper and/or lower radiused portion 172, 174 may be formed at an inner radius 176 having an inner radius/core thickness ratio of no less than approximately 2:1 as mentioned above. For example, for a core thickness 224 of approximately 1.0 inch, the upper radiused portion 172 may be formed such that the airflow face sheet 232 has a relatively small inner radius 176 of approximately 2.0 inch or less.

Step 304 of the method 300 of FIG. 16 may include fluidly coupling the cells 226 to the airflow 144 using a plurality of holes 254 formed in the airflow face sheet 232 of the honeycomb sandwich structure 220 of the upper and/or lower radiused portion 172, 174. As indicated above, the holes 254 may be sized and configured to provide a desired combined cross-sectional area of the holes 254 relative to the wetted surface area of the airflow face sheet 232. For example, the airflow face sheet 232 of the upper and/or lower radiused portion 172, 174 may include a plurality of holes 254 having a combined cross-sectional area in a range of from approximately 3 to 20 percent (e.g., 4 to 16 percent) of the wetted surface area of the airflow face sheet 232 without the holes 254.

Step 306 of the method 300 of FIG. 16 may include passing a portion of the airflow 144 through the holes 254 such that the airflow 144 enters the cells 226 of the honeycomb core 222. As indicated above, the holes 254 and the upper and lower radiused portions 172, 174 may enhance the acoustic attenuation capability of the inner wall panel 162. In this regard, the upper and lower radiused portions 172, 174 may provide an amount of acoustic attenuation per unit surface area that is larger than the acoustic attenuation per unit surface area of the remaining portions of the inner wall panel 162.

Step 308 of the method 300 of FIG. 16 may include absorbing acoustic energy of the airflow 144 in response to the airflow 144 entering the cells 226. For example, acoustic energy in the airflow 144 entering the cells 226 may be turned into heat which may result in a reduction of the noise output of the turbine engine 108. The size, shape, and configuration of the holes 254 in the airflow face sheet 232 and the size and shape of the cells 226 of the core 222 may be tailored to attenuate a desired frequency band of noise generated by the passage of airflow 144 through the bifurcated fan ducts 138.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An acoustic-attenuating wall panel, comprising:
a radiused portion of an inner wall panel of a nacelle;
the radiused portion including an airflow surface having a concave configuration being exposed to an airflow; and
the radiused portion comprising an acoustic attenuating section and formed as a honeycomb sandwich structure having a honeycomb core sandwiched between a pair of face sheets;
the honeycomb core in the radiused portion has a cell width that is the same as the cell width of the honeycomb core in at least one of the following portions of the inner wall panel: a barrel portion, an upper bifurcation, a lower bifurcation.

2. The acoustic-attenuating wall panel of claim 1 wherein:
the honeycomb sandwich structure is a metallic honeycomb sandwich structure.

3. The acoustic-attenuating wall panel of claim 1 wherein:
the honeycomb core has a core thickness; and
the airflow surface is provided by an airflow face sheet having an inner radius; and
the inner radius being formed at an inner radius/core thickness ratio of no less than approximately 2:1.

4. The acoustic-attenuating wall panel of claim 3 wherein:
the inner radius is no less than approximately 2.0 inches.

5. An inner wall panel, comprising:
a semi-circular barrel portion having circumferentially opposite ends;
an upper bifurcation wall portion and a lower bifurcation wall portion extending radially outwardly from the circumferentially opposite ends of the barrel portion;
an upper radiused portion and a lower radiused portion joining the respective upper and lower bifurcation wall portion to the circumferentially opposite ends of the barrel portion; and
at least one of the upper and lower radiused portions being formed as a honeycomb sandwich structure having a honeycomb core sandwiched between a pair of face sheets, the honeycomb core in the radiused portion has a cell width that is the same as the cell width of the honeycomb core in at least one of the following portions of the inner wall panel: a barrel portion, an upper bifurcation, a lower bifurcation; and
the inner wall panel comprising a metallic, one-piece, unitary structure.

6. The inner wall panel of claim 5 wherein:
the inner wall panel forms part of a nacelle of a gas turbine engine.

7. The inner wall panel of claim 5 wherein:
the upper and lower radiused portion each include an airflow surface having a concave configuration being exposed to an airflow through a nacelle.

8. The inner wall panel of claim 5 wherein:
at least one of the upper and lower radiused portions comprises an acoustic attenuating section.

9. The inner wall panel of claim 5 wherein:
both of the upper and lower radiused portions comprise a honeycomb sandwich structure.

10. An aircraft, comprising:
a nacelle connected to a turbine engine, the nacelle having an inner wall panel positioned along a duct airflow path of an airflow;
the inner wall panel having a radiused portion including an airflow surface having a concave configuration being exposed to an airflow;
the radiused portion comprising an acoustic attenuating section and formed as a honeycomb sandwich structure having a core sandwiched between a pair of face sheets; and
the honeycomb core in the radiused portion has a cell width that is the same as the cell width of the honeycomb core in at least one of the following portions of the inner wall panel: a barrel portion, an upper bifurcation, a lower bifurcation.

11. The aircraft of claim 10 wherein:
the the honeycomb sandwich structure is a metallic honeycomb sandwich structure.

12. The aircraft of claim 10 wherein:
at least one of the face sheets comprises an airflow face sheet forming an airflow surface exposed to the airflow; and
at least a portion of the airflow face sheet having a plurality of holes fluidly coupling the cells to the airflow.

13. The aircraft of claim 11 wherein:
the honeycomb core has a core thickness;
the airflow surface is provided by an airflow face sheet having an inner radius; and
the inner radius being formed at an inner radius/core thickness ratio of no less than approximately 2:1.

14. The aircraft of claim 13 wherein:
the inner radius is no less than approximately 2.0 inches.

15. The aircraft of claim 11 wherein:
the nacelle includes a bifurcated fan duct defined by the inner wall panel and an outer wall, the inner wall panel extending between generally radially opposite sides of the outer wall;
the inner wall panel comprising a semi-circular barrel portion having an upper bifurcation wall portion and a lower bifurcation wall portion extending radially outwardly from circumferentially opposite ends of the barrel portion;
each one of the upper and lower bifurcation wall portions being joined to the barrel portion by a respective upper and lower radiused portion; and
the inner wall panel being formed as a one-piece, unitary structure.

16. A method of attenuating noise of a turbine engine, comprising the steps of:
passing an airflow along a concave airflow surface of a radiused portion of an inner wall panel within a nacelle, the radiused portion comprising a honeycomb sandwich structure including a honeycomb core sandwiched between a pair of face sheets and having a plurality of cells, the honeycomb core in the radiused portion has a cell width that is the same as the cell width of the honeycomb core in at least one of the following portions of the inner wall panel: a barrel portion, an upper bifurcation, a lower bifurcation;
fluidly coupling the cells to the airflow through a plurality of holes formed in an airflow face sheet of the honeycomb sandwich structure; and
absorbing acoustic energy in the airflow fluidly coupled to the cells.

17. The method of claim 16 further comprising the steps of:
passing a portion of the airflow through the holes such that the airflow enters the cells; and
absorbing acoustic energy in response to the airflow entering the cells.

18. The method of claim 16 wherein:
the honeycomb sandwich structure is a metallic honeycomb sandwich structure.

19. The method of claim 16 wherein the airflow face sheet has an inner radius, the honeycomb core having a core thickness, the method further comprising the step of:
providing the airflow face sheet with an inner radius having an inner radius/core thickness ratio of no less than approximately 2:1.

20. The method of claim 16 further comprising the step of:
providing the airflow face sheet with an inner radius at no less than approximately 2.0 inches.

* * * * *